(12) United States Patent
Schäffler et al.

(10) Patent No.: US 7,043,409 B1
(45) Date of Patent: May 9, 2006

(54) METHOD AND DEVICE FOR DESIGNING A TECHNICAL SYSTEM

(75) Inventors: Stefan Schäffler, Augsburg (DE); Thomas Sturm, München (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/601,567

(22) PCT Filed: Dec. 1, 1999

(86) PCT No.: PCT/DE99/03820

§ 371 (c)(1),
(2), (4) Date: Aug. 3, 2000

(87) PCT Pub. No.: WO00/33209

PCT Pub. Date: Jun. 8, 2000

(30) Foreign Application Priority Data

Dec. 3, 1998 (DE) .................. 198 55 876

(51) Int. Cl.
*G06F 17/10* (2006.01)

(52) U.S. Cl. ............... 703/2; 700/30; 700/31; 702/182; 702/189

(58) Field of Classification Search ............ 703/2; 700/28, 29, 30, 31, 32; 705/8; 702/182, 702/189
See application file for complete search history.

(56) References Cited

U.S. PATENT DOCUMENTS 5,486,995 A * 1/1996 Krist et al. .............. 700/29
6,038,540 A * 3/2000 Krist et al. .............. 705/8
6,768,972 B1 * 7/2004 Schäffler et al. .......... 702/189

FOREIGN PATENT DOCUMENTS

WO  WO 98 27474  * 6/1998

OTHER PUBLICATIONS

Van Baaren et al., R.J. Design for RMS/LCC the Development of a Design Model, IEEE, Reliability and Maintainability Symposium, 1999, pp. 330-335.*
Chouikha et al., M. Model-Based Control Synthesis of Continuous-Discrete Systems, IEEE SMC '99 International Conference on Systems, Man, and Cybernetics, vol. 4, Oct. 1999, pp. 452-456.*
Guo et al., L. A Control Scheme for Bilinear Systems and Application to a Secondary Controlled Hydraulic Rotary Drive, Proceedings of the 28th IEEE Conference on Decision and Control, Dec. 1999, pp. 542-547.*
Lefarth, U. Computer-Aided Development of Mechatronic Systems, IEEE/IFAC Joint Symposium on Computer-Aided Control System Design, Mar. 1994, pp. 561-567.*

* cited by examiner

*Primary Examiner*—Russell Frejd
(74) *Attorney, Agent, or Firm*—Morrison & Foerster LLP

(57) ABSTRACT

A method and arrangement for the design of a technical system measured data of a given system are described on the basis of an equivalent model. In a dimensional coefficient for the quality of the equivalent model is thereby determined in that the measured data of the system are compared to data defined by the equivalent model. The equivalent model is adapted on the basis of the dimensional coefficient in view of an optimally high quality. The dimensional coefficient is improved on the basis of additional measured data, and the adapted equivalent model is utilized for the design of the technical system.

11 Claims, 3 Drawing Sheets

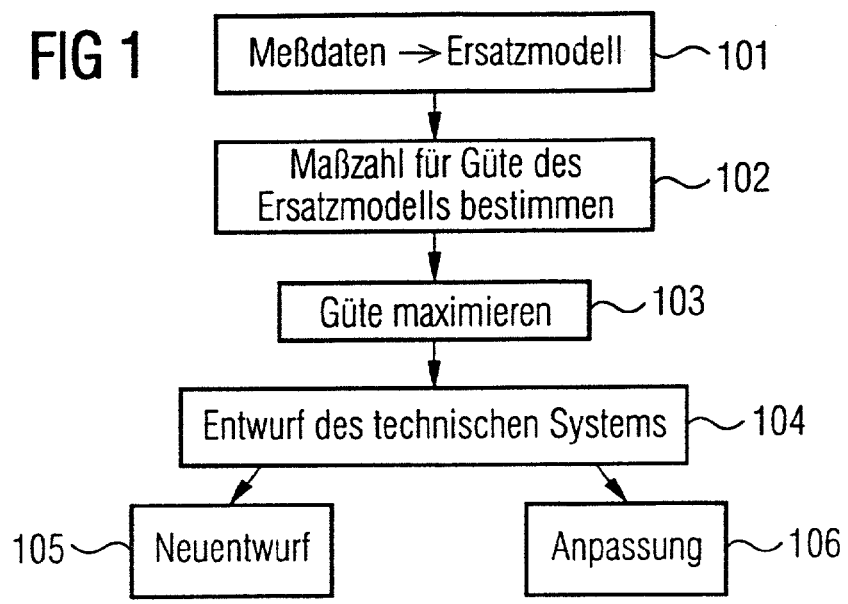
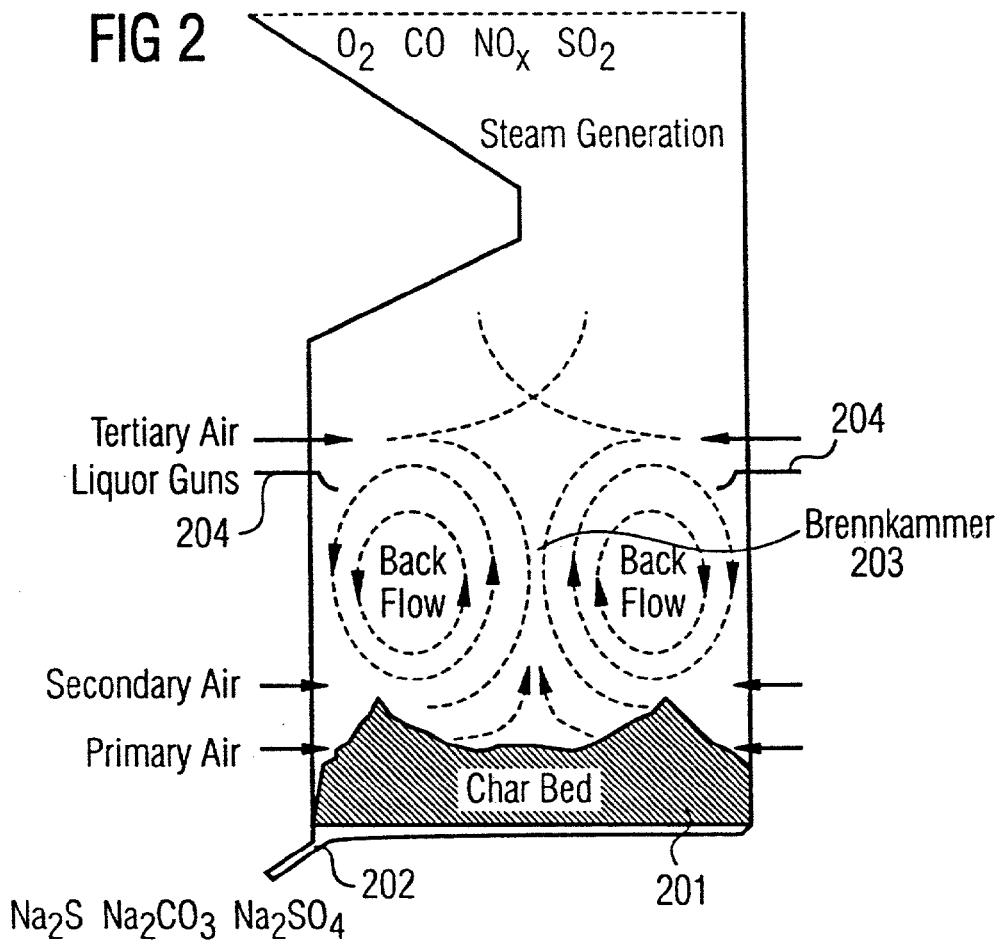

FIG 3

| | Eingangsgrößen | |
|---|---|---|
| | Meßgröße | Beschreibung |
| 1 | FI 7081 | BL Flow |
| 2 | QI 7082 A | Dry Solids Content |
| 3 | FIC 7280 X | PA Primary Air |
| 4 | FIC 7281 X | SA Secondary Air |
| 5 | FIC 7282 X | TA Tertiary Air |
| 6 | PI 7283 | PA Pressure |
| 7 | PI 7284 | SA Pressure |
| 8 | PHI 7285 | TA Pressure |
| 9 | TIC 7288 X | PA Temperature |
| 10 | TIC 7289 X | SA Temperature |
| 11 | PIC 7305 X | Press Induced Draft |
| 12 | HO 7338 | Oil Valve |
| 13 | TI 7347 | BL Temperature |
| 14 | PIC 7349 X | BL Front Pressure |
| 15 | PIC 7351 X | BL Back Pressure |

FIG 4

| | Stellgrößen | |
|---|---|---|
| | Meßgröße | Beschreibung |
| 1 | FIC 7280 X | PA Primary Air |
| 2 | FIC 7281 X | SA Secondary Air |
| 3 | FIC 7282 X | TA Tertiary Air |
| 4 | PIC 7349 X | BL Front Pressure |

FIG 5

| | Ausgangsgrößen | |
|---|---|---|
| | Meßgröße | Beschreibung |
| 1 | TIC 7249 X | Steam Temperature |
| 2 | FI 7250 | Steam Production |
| 3 | QI 7322 | $O_2$ |
| 4 | TI 7323 | Smoke Temperature |
| 5 | QI 7331 | $H_2S$ |
| 6 | QI 7332 | $SO_2$ |
| 7 | QIC 7333 X | CO |
| 8 | QIC 7370 X | Spec. Weight of Green Liquor |
| 9 | QI 7531 | NO |
| 10 | IBM 8096 | Reduction Efficiency |
| 11 | IBM 8109 | PH Value |
| 12 | TI 7352 | Bed Temperature |
| 13 | IBM 8015 | $NaOH$ |
| 14 | IBM 8016 | $Na_2S$ |
| 15 | IBM 8017 | $Na_2CO_3$ |

METHOD AND DEVICE FOR DESIGNING A TECHNICAL SYSTEM

The invention is directed to a method and to an arrangement for the design of a technical system.

A system behavior of a technical system, for example of a processing system or of a system of heavy industry, is dependent on numerous parameters. Pre-conditions, for example in view of the economic feasibility or the environmental pollution of the system, must be adhered to during the course of designing such a system, i.e. particularly given the re-design or when adapting or, respectively, setting an already existing system. Each pre-condition is formulated as a target function whose optimization in view of the other target functions is a general goal.

The object of the invention is comprised in enabling the design of a technical system on the basis of measured data of a predetermined system, whereby a designational determination of measured data approximates an equivalent model to the predetermined system with high precision. Such a use of known measured data is of great significance precisely in view of an optimization of the existing system or, respectively, in view of an optimized re-design of a system.

This object is achieved according to the features of the independent patent claims. Developments of the invention also derive from the dependent claims.

For achieving the object, a method for the design of a technical system is recited wherein measured data of a predetermined system are described on the basis of an equivalent model. A dimensional coefficient is determined for the quality of the equivalent model in that the measured data of the predetermined system are compared to data defined by the equivalent model. The equivalent model is adapted on the basis of the dimensional coefficient for the quality to the effect that it exhibits an optimally high quality. The dimensional coefficient for the quality of the equivalent model is improved in that additional measured data of the predetermined system are identified. The equivalent model adapted in view of its quality is utilized for the design of the technical system.

The measured data existing from many different, realized systems are utilized for the description of the equivalent model. An attempt to simulate the predetermined system as well as possible is made with the equivalent model. The dimensional coefficient for the quality of the simulation is determined in that the real measured data are compared to the data that are acquired on the basis of the equivalent model. A great difference between the measured data and the data of the equivalent model corresponds to a poor quality, i.e. to a poor imaging of the predetermined system into the equivalent model. The equivalent model is adapted by the dimensional coefficient for the quality to the effect that the quality itself becomes as high as possible and, thus, the equivalent model describes the given system as well as possible. When there are individual measured data that particularly deviate from the data of the equivalent model, then additional measured data are determined in a predetermined environment of these measured data, so that a more precise adaptation (and, thus, a further increase in the quality) of the equivalent model to the given system can ensue. The high-quality equivalent model obtained in this way is utilized for the design of the technical system.

What are generally understood by design are both the new design of a technical system as well as the adaption of an already existing technical system.

One development is comprised therein that the equivalent model is a regression model. The regression model proceeds from the description $$y_i = f_\beta(x_i) + e_i,$$

whereby $(y_i, x_i)$ denote predetermined value pairs, $f_\beta$ denotes a function that is dependent on a parameter $\beta$, and $e_i$ denotes an error.

The error (as a function of $\beta$) is then to be minimized:

$$\sum_{i=1}^{n} e_i^2 = \varphi(\beta).$$

When one proceeds from the following example:

$$y = \beta_0 + \beta_1 x + \beta_2 x^2 + e,$$

then the functional relationship is of a quadratic order, but the regression model (function, dependent on $\beta$) is linear.

An additional enhancement of the quality of the equivalent model is achieved in that at least one sub-area of the equivalent model is locally adapted. An adaptation of the equivalent model thereby ensues by additional (local) determination of measured values, which are utilized for the more precise adaptation of the equivalent model to the given system.

In another development, the quality can be determined on the basis of a quadratic deviation of the measured data from the data defined by the equivalent model. The adaptation of the equivalent model ensues by minimizing the quadratic deviation.

One improvement is comprised therein that the measured data are sorted according to their quality with reference to their deviation from the data defined by the equivalent model, and a predetermined plurality of n % worst measured data are eliminated. A quality is thus defined for each measured datum, whereby the set of measured data are sorted according to their quality, preferably in the form of a list, and the n % worst or, respectively, the n worst measured data are eliminated. A check is to be carried out, in particular, to see whether the n % or, respectively, the n worst measured data lie in an interconnected area. When this is the case, then these measured data are not eliminated, since there is a high probability that they are not measuring errors but define an interconnected area that was not defined precisely enough by the equivalent model.

Another development is comprised therein that the measured data are subjected to a pre-processing. Since a great quantity of measured data per time unit arise in a real, given system, it is meaningful to subject these measured data to a pre-processing and to thus assure that largely significant measured data enter into the formation of the equivalent model. The pre-processing is preferably expressed in a reduction of the plurality of measured data.

The measured data are thereby divided into classes according to predetermined criteria. The measured values of a class are weighted, and those measured values whose weighting lies below a predetermined, first threshold are eliminated. A reduction in view of the plurality of measured values derives due to the elimination of the measured values. A clearly reduced plurality of measured values are thus present for a further-processing. The further-processing can ensue with less of a calculating outlay compared to the non-reduced plurality of measured values.

The classes themselves can also be weighted. In particular, a class whose weighting lies below a predetermined, second threshold can be eliminated. An additional reduction in the plurality of measured values derives as a result thereof.

Another development of the pre-processing is comprised therein that one criterion for the class division is comprised therein that measured values per class are determined with respect to a default of setting parameters of the technical system. Typically, the technical system is set on the basis of a predetermined plurality of setting parameters; a reaction (usually time-delayed) of the system to the setting parameters (transient behavior, transiency of the system) ensues after the setting. After the setting, thus, a certain number of measured values are registered that can be assigned to the transiency, whereby measured values that are allocated to the predetermined set of setting parameters continue to arise after the transiency has ended (switch into the stationary mode). A new class is defined by adjusting the setting parameters. All measured values that respectively arise after an adjustment of the setting values belong in their own class.

Additionally, measured values of a class that can be allocated to the respective transiency can be eliminated. The setting of large technical systems is directed to a long-term stationary mode in many instances. Measured values that refer to the transiency (having short duration compared to the stationary mode after the end of the transiency) are meaningfully eliminated since they falsify measured values for the stationary mode. The measured data of the stationary behavior of the technical system are of interest particularly in the framework of a modelling of the technical system.

One embodiment is comprised in reducing the plurality of measured values in a class in that at least one representative value is determined for the measured values of the class. Such a representative value can be:
a) an average value (for example, a sliding average) of the measured values of the class;
b) a maximum value of the measured values of the class;
c) a minimum value of the measured values of the class;
d) a median.

One advantage given version d) is comprised therein that a value can be determined that in fact exists, in contrast whereto the average a) itself does not occur as a value.

A suitable selection for determining the representative value of a class can ensue dependent on the application.

An entire class with measured values can be eliminated when this contains fewer than a predetermined plurality of measured values.

Another embodiment is comprises therein that those measured values are eliminated that differ from a prescribable value by more than a predetermined threshold. The prescribable value can be an average of all measured values of the class or a measured value to be expected in response to the respective setting parameters of the technical system.

In the framework of another development, the data acquired with the design are utilized for the control of a technical system. Additionally, the control of the technical system can ensue during the running time of the system, i.e. online.

An arrangement for the design of a technical system is also recited for achieving the object, said arrangement comprising a processor unit that is configured such that measured data of a given system can be described on the basis of an equivalent model. A dimensional coefficient for the quality of the equivalent model can be determined in that the measured data of the given system are compared to data determined by the equivalent model. The equivalent model can be adapted based on the dimensional coefficient for the quality to the effect that it exhibits an optimally high quality. The dimensional coefficient for the quality of the equivalent model can be improved further in that measured data of the given system are additionally determined. The equivalent model adapted in view of its quality can be utilized for the design of the technical system.

This arrangement is particularly suited for the implementation of the inventive method or one of its developments explained above.

Exemplary embodiments of the invention are shown and explained below on the basis of the drawing.

Shown are:

FIG. 1 a block diagram that contains steps of a method for the design of a technical system;

FIG. 2 a schematic sketch of a recovery boiler;

FIGS. 3–5 input quantities, manipulated variables and output quantities of the recovery boiler.

FIG. 1 shows a block circuit diagram that contains steps of a method for the design of a technical system. In a step 101, an equivalent model is formed on the basis of measured data. This equivalent model is preferably a regression model. The first and the second derivation are then directly established given a quadratic function f. In order to adapt the equivalent model that has arisen in step 101 to the measured data, i.e. in order to refine the equivalent model such that the measured data describe the equivalent model with adequate approximation, a dimensional coefficient for the quality of the equivalent model is determined in a step 102. This dimensional coefficient is determined in that the measured data of the given system are compared to data determined by the equivalent model. Each measured datum preferably contains a dimensional coefficient for the quality, said dimensional coefficient characterizing the deviation of the measured datum from the appertaining value defined by the equivalent model. The sum of all dimensional coefficients for the quality for all measured data determines an overall quality for the equivalent model. The quality is maximized in a step 103 in that the dimensional coefficient for the quality is maximized. In addition, the dimensional coefficient is refined, i.e. the quality of the coincidence of the equivalent model with the given system is enhanced, in that measured data are designationally defined at the points at which a great deviation exists between measured data and data determined by the equivalent model and enter into the formation of the equivalent model. When a correspondingly high quality has been determined for the equivalent model, then this equivalent model is utilized in step 104 for the design of the technical system. The design can be both a new design (see step 105) or an adaptation of a technical system that already exists (see step 106).

FIG. 2 shows a schematic sketch of a recovery boiler. An exemplary embodiment of the above-described method is illustrated below with reference to the "recovery boiler" example.

In the paper and pulp industry, various chemicals as well as heat and electrical energy are required for the pulping of cellulose. The chemicals that are employed and, additionally, thermal energy can be recovered from a spent process liquor (black liquor) with the assistance of the recovery boiler. A degree of recovery of the chemicals is of critical significance for the economic feasibility of the overall system.

The black liquor is burned in a molten bed 201. A alkali melt that flows off via a conduit 202 is thereby formed. The chemicals that have been utilized are recovered from the constituents of the alkali melt in further process steps. Combustion heat that has been released is used for generating water steam. The burning of the spent liquor and, thus, the recovery of the chemicals begins with the atomization of the black liquor via atomizer nozzles 204 into a combustion chamber 203. Particles of the atomized black liquor are dried during their fall by the hot flue gas. The dried liquor particles fall onto the molten bed 201, whereby a first combustion and a chemical reduction occur. Volatile constituents and reaction products proceed into an oxidation zone wherein oxidizing reactions occur and wherein the combustion is ended.

Important objectives for the control of the recovery boiler are the steam production for energy production, the adherence to emission values from environmental points of view and the efficiency of the chemical reduction.

The combustion process and, thus, the objectives are particularly controlled by the air feed in three levels, primary air (PA), secondary air (SA), tertiary air (TA). The overall process is subject to numerous influences that are to be taken into consideration in the modelling:

a) The measurement of the quantities is often subject to great fluctuations;
b) There are influencing variables that are not measured and cannot be measured;
c) Transient events occur given every change of the adjustable parameters;
d) The technical system gets dirty and is cleaned at predetermined intervals, as a result whereof a time drift is respectively effected in the system behavior.

The measured quantities of the overall process are divided into input quantities (see FIG. 3) and output quantities (see FIG. 5). Measured values are stored every minute. Four of the input quantities are also manipulated variable at the same time (also: adjustable parameters; see FIG. 4). The manipulated variables are to be essentially viewed as parameters of the overall process that are freely adjustable independently of one another. Some of the other input quantities are more or less dependent of the manipulated variables. According to a regulation, the quantities "BL front pressure" and "BL back pressure" are always to be identically regulated. The four manipulated variables (see FIG. 4) should preferably be stored as manipulated variables (with the desired, pre-set value) and as input quantities (with the measured, real value).

One problem given a recovery boiler is to meet specific objectives determined dependent on the adjustable parameters, said objectives being defined via measured quantities. A three-stage procedure is selected here for solving the problem:

1. The objectives to be considered are modelled by stochastic methods, whereby these models are updated by new measurements (data-driven, empirical modelling). It is thereby meaningful to employ not only a single model but global models for the identification of interesting areas in a parameter space defined by the objectives and local models for the exact calculation of optimum operating points. The models employed are evaluated by quality criteria.
2. When the models under consideration are not adequately exact (quality criterion) due to the data situation, new operating points are designationally evaluated for improving the model (experimental design). By employing global stochastic optimization methods with respect to the objectives, further, attractive areas are identified dependent on the current global model.
3. Local models are constructed for the local optimization and the available datasets are potentially designationally expanded (experimental design).

The objectives are a matter of physical-technical or, respectively, industrial management criteria that must usually correspond the boundary conditions and/or safety conditions. Frequently, a plurality of these criteria must be simultaneously considered. The employment of a stochastic model can, in particular, be employed to simulate the target quantities to be optimized and their dependency of the parameters to be set in the computer. This is necessary when measurements are very cost-intensive or, respectively, time-consuming. Possible hazardous situations can be avoided given safety demands.

An online optimization that is based on a plurality of data is necessary given a recovery boiler because the physical-chemical processes cannot be quantitatively modelled with adequate precision and because the behavior of the system is subject to fluctuations during the course of operations. The knowledge about this behavior must be constantly expanded by designational selection of new operating points. The three-stage procedure of stochastic modelling and mathematical optimization that has already been described is therefore recommendable in the framework of the online optimization.

DESCRIPTION OF THE INPUT QUANTITIES

The 'a' input quantities ($a \in N$, N: set of natural numbers) are generally dependent on n manipulated variables $n \in N$ and on random effects. They can be described as follows:

Let $(\Omega, s, p)$ be a probability space and $\mathcal{B}^v$ be a Borel's $\sigma$-algebra over $\mathbf{R}^v$ ($\mathbf{R}$: set of real numbers) for each $v \in N$. The input quantities are presented via $\mathcal{B}^n \times s - \mathcal{B}^a$-measurable imaging $\phi$:

$$\phi: \mathbf{R}^n \times \Omega \to \mathbf{R}^a \qquad (1).$$

The definition set of the imaging $\phi$ is a Cartesian product of two sets. When the respective projections onto the individual sets are considered, then the following imagings are obtained:

$$\phi_x: \Omega \to \mathbf{R}^a, \omega \to \phi(x, \omega) \text{ for all } x \in \mathbf{R}^n \qquad (2),$$

$$\phi^\omega: \mathbf{R}^n \to \mathbf{R}^a, x \to \phi(x, \omega) \text{ for all } \omega \in \Omega \qquad (3).$$

$\{\phi_x; x \in \mathbf{R}^n\}$ is a stochastic process with an index set $\mathbf{R}^n$ and an imaging $\phi^\omega$ is a path of this stochastic process for each event $\omega \in \Omega$.

In the recovery boiler, n=4 and a=14 apply (after elimination of the quantity "BL back pressure").

Due to the required measurability of the imaging $\phi_x$, the imaging $\phi_x$ is a random variable for every $x \in \mathbf{R}^n$. Under suitable supplementary conditions, anticipated values and higher moments can be observed. This access enables the step from stochastic models to deterministic optimization problems. Given a deterministic optimization problem, the target function can be directly set with a variable, in contrast whereto the stochastic quantity influences the target function but does not enable a designational setting.

Description of the Output Quantities

The process model M of the recovery model is described as function dependent on the input quantities and further random effects. Thereby let $(\Omega, s, p)$ be the above probability space. The process model M is then a $\mathcal{B}^a \times s - \mathcal{B}^b$-measurable imaging:

$$M: \mathbf{R}^a \times \Omega \to \mathbf{R}^b \qquad (4),$$

whereby b indicates the plurality of output quantities.

Since the recovery boiler is subject to a cyclical time drift (from cleaning phase to cleaning phase), a description with a time parameters is also conceivable. The output quantities can be presented by $\mathcal{B}^n \times \mathcal{S} - \mathcal{B}^b$-measurable imagings $\psi$:

$$\psi: \mathbf{R}^n \times \Omega \to \mathbf{R}^b \quad (5),$$

$$(x, \omega) \to M(\varphi(x, \omega), \omega) \quad (6).$$

When the respective projections onto the individual sets of the definition set are considered, then the following imagings are obtained:

$$\psi_x: \Omega \to \mathbf{R}^b, \omega \to \psi(x, \omega) \text{ for all } x \in \mathbf{R}^n \quad (7),$$

$$\psi^\omega: \mathbf{R}^n \to \mathbf{R}^b, x \to \psi(x, \omega) \text{ for all } \omega \in \Omega \quad (8).$$

$\{\psi_x; x \in \mathbf{R}^n\}$ is a stochastic process with an index set $\mathbf{R}^n$ and the imaging $\psi^\omega$ is a path of this stochastic process for each $\omega \in \Omega$.

Given the recovery boiler, b=15 applies.

The fact that a distinction is not made between the employed events $\omega$ in the definition of $\psi$ does not denote a limitation, since $\Omega$ can be presented as Cartesian product of a $\Omega_1$ and a $\Omega_2$. The above presentation thus also covers the model:

$$\psi: \mathbf{R}_n \times \Omega_1 \times \Omega_2 \to \mathbf{R}^b \quad (9),$$

$$(x, \omega_1, \omega_2) \to M(\varphi(x, \omega_1), \omega_2) \quad (10).$$

Description of the Available Datasets

With the descriptions in the two preceding sections, the input quantities and the output quantities can be combined in common to the measured quantities (=measured date) $\Phi$. $\Phi$ is a $\mathcal{B}^n \times \mathcal{S} - \mathcal{B}^m$-measurable imaging with m=a+b and $$\Phi: \mathbf{R}^n \times \Omega \to \mathbf{R}^m \quad (11).$$

$$(x, \omega) \to \begin{pmatrix} \varphi(x, \omega) \\ \psi(x, \omega) \end{pmatrix} \quad (12)$$

When the respective projections onto the individual sets of the definition set are again considered, then the following imagings are obtained:

$$\psi_x: \Omega \to \mathbf{R}^b, \omega \to \psi(x, \omega) \text{ for all } x \in \mathbf{R}^n \quad (7),$$

$$\Phi^\omega: \mathbf{R}^n \to \mathbf{R}^m, x \to \Phi(x, \omega) \text{ for all } \omega \in \Omega \quad (14).$$

$\{\Phi_x; x \in \mathbf{R}^n\}$ is a stochastic process with an index set $\mathbf{R}^n$ and the imaging $\Phi^\omega$ is a path of this stochastic process for each $\omega \in \Omega$.

Many realizations of $\Phi_x$ are determined for each selected manipulated variable duplet x in the recovery boiler, i.e. numerous realizations $$\Phi_{jk} := \Phi(x_j, \omega_{jk}) \quad (15)$$

with $$\omega_{jk} \in \Omega; k=1,2,\ldots,v_j;$$

$$v_j \in N; j=1,2,\ldots,u; u \in N$$

are considered for each $x_j \in \mathbf{R}^n$. The stored data sets $D_{jk}$ of the recovery boiler are thus (n+m) duplets:

$$D_{jk} = \begin{pmatrix} x_j \\ \Phi_{jk} \end{pmatrix},$$

$$k=1,2,\ldots,v_j; j=1,2,\ldots,u \quad (16).$$

When $$(j_1 < j_2) \vee ((j_1 = j_2) \wedge (k_1 < k_2))$$

applies, $D_{j_1 k_1}$, k is thereby stored before $D_{j_2 k_2}$.

Data Compression by Class Division of the Parameters

Since a plurality of realizations are generally present for each manipulated variable duplet x, a class division of the parameters by forming arithmetic averages lies at hand as first step of the statistical data analysis due to the complex stochastic properties of the process to be considered. Moreover, obviously faulty datasets are discarded. For example, an obviously faulty dataset is a physically impossible measurement that cannot occur at all in reality, particularly due to a setting that has been undertaken.

Procedure:
1. Datasets wherein the quantity "BL front pressure" is unequal to the quantity "BL back pressure" are discarded since these two values must be equal according to the default of the system control. The data loss is very slight.
2. The datasets are divided onto classes wherein the four setting parameters (PA, SA, TA, BL front pressure; see above) are constant in chronological succession, i.e. the $j^{th}$ class is composed of the datasets $D_{j\bullet}$.
3. Classes that contain fewer than 30 datasets are discarded, so that transient events do not have a great influence.
4. An arithmetic average $\overline{\Phi}_j$ and an empirical standard deviation $s_j$ are determined for all measured quantities:

$$\overline{\Phi}_j = \frac{1}{v_j} \cdot \sum_{k=1}^{v_j} \Phi_{jk}, \quad (17)$$

$$s_j = \begin{pmatrix} \left( \frac{1}{v_j - 1} \cdot \sum_{k=1}^{v_j} \left( \Phi_{jk}^{(1)} - \overline{\Phi}_j^{(1)} \right)^2 \right)^{\frac{1}{2}} \\ \vdots \\ \left( \frac{1}{v_j - 1} \cdot \sum_{k=1}^{v_j} \left( \Phi_{jk}^{(m)} - \overline{\Phi}_j^{(m)} \right)^2 \right)^{\frac{1}{2}} \end{pmatrix}. \quad (18)$$

5. Classes wherein the averages for the quantities PA, SA, TA or BL front pressure are too far from the corresponding setting parameters are eliminated. The setting values could thus not be achieved on these classes.

Statistical Characteristics for the Given Classes and their Graphic Presentation In addition to the arithmetic averages and the empirical standard deviations that were determined for the individual classes, a measured standard deviation s is also determined according to $$s = \begin{pmatrix} \left( \frac{1}{v - 1} \cdot \sum_{j=1}^{u} (v_j - 1) s_j^{(1)2} \right)^{\frac{1}{2}} \\ \vdots \\ \left( \frac{1}{v - 1} \cdot \sum_{j=1}^{u} (v_j - 1) s_j^{(m)2} \right)^{\frac{1}{2}} \end{pmatrix} \quad (19)$$

u thereby stands for the plurality of classes (205 here), and v stands for the sum of the $v_j$, i.e. v is the plurality of all measured values employed (38915 here)

Linear Regression Models for Functions Approximations

Based on the arithmetic average over the classes, a linear regression model is calculated for each measured quantity (measured datum) $\Phi^{(i)}$ (i=1,2, ... ,m) dependent on the quadratic combination of the four setting parameters. In the following presentation, $x \in \mathbb{R}^4$ applies, whereby $x^{(1)}$: primary air (PA)
$x^{(2)}$: secondary air (SA)
$x^{(3)}$: tertiary air (TA)
$x^{(4)}$: black liquor (BL) front pressure apply. $u \in \mathbb{N}$ references the plurality of classes. Each measured quantity $\Phi^{(i)}$ is modelled by $$\Phi^{(i)}(x, \omega) = a_i^T r(x) + e_i(\omega) \quad (20)$$

with $a_i \in \mathbb{R}^{15}$.

$$r: \mathbb{R}^4 \to \mathbb{R}^{15} \quad (21)$$

$$(\zeta_1, \zeta_2, \zeta_3, \zeta_4)^T \to (1, \zeta_1, \zeta_2, \zeta_3, \zeta_4, \zeta_1^2, \zeta_2^2, \zeta_3^2, \zeta_4^2, \zeta_1\zeta_2, \zeta_1\zeta_3, \zeta_1\zeta_4, \zeta_2\zeta_3, \zeta_2\zeta_4, \zeta_3\zeta_4)^T \quad (22),$$

are thereby valid, i.e. polynomials of the second degree are adapted to the measured data, and $$e_i: \Omega \to \mathfrak{R} \quad (23)$$

is a random variable with anticipation value 0.

The vector $a_i$ is determined with the method of the least error square; however, the arithmetic averages $$(x_j, \overline{\Phi}_j^{(i)})^T$$

are employed instead of the original datasets $$(x_j, \Phi_{jk}^{(i)})^T.$$

This procedure is suitable since, in particular, anticipation values are estimated by linear regression models. The following minimization problem is thus obtained:

$$\min_{a_i \in \mathbb{R}^{15}} \left\{ \left\| \begin{pmatrix} \overline{\Phi}_1^{(i)} \\ \vdots \\ \overline{\Phi}_u^{(i)} \end{pmatrix} - \begin{pmatrix} r(x_1)^T \\ \vdots \\ r(x_u)^T \end{pmatrix} \cdot \begin{pmatrix} a_i^{(1)} \\ \vdots \\ a_i^{(15)} \end{pmatrix} \right\|_2^2 \right\}. \quad (24)$$

Let $\overline{a}_i$ be the optimum point of the quadratic minimization problem from Equation (24). Also let $$\hat{y}_i := \begin{pmatrix} r(x_1)^T \\ \vdots \\ r(x_u)^T \end{pmatrix} \cdot \begin{pmatrix} \overline{a}_i^{(1)} \\ \vdots \\ \overline{a}_i^{(15)} \end{pmatrix} \in \mathbb{R}^u, \quad (25)$$

$$y_i := \frac{1}{u} \cdot \sum_{j=1}^{u} \overline{\Phi}_j^{(i)} \in \mathbb{R} \quad (26)$$

apply. For validation of the regression approach, a definiteness criterion $R^2$ is calculated according to $$R^2 := \frac{\sum_{j=1}^{u} (\hat{y}_i^{(j)} - \overline{y}_i)^2}{\sum_{j=1}^{u} (\overline{\Phi}_j^{(i)} - \overline{y}_i)^2} = \frac{\hat{y}_i^T \hat{y}_i - u\overline{y}_i^2}{\overline{\Phi}^{(i)T}\overline{\Phi}^{(i)} - u\overline{y}_i^2} \quad (27)$$

with $$\overline{\Phi}^{(i)} = \begin{pmatrix} \overline{\Phi}_1^{(i)} \\ \vdots \\ \overline{\Phi}_u^{(i)} \end{pmatrix}. \quad (28)$$

The dependent variable is presented all the better by the independent variable the closer $R_i^2$ lies to 1, ($0 \leq R_i^2 \leq 1$).

Additionally, a maximum $E_{max}^{(i)}$ for an absolute value of the deviation of the data from the model is recited as $$E_{max}^{(i)} := \max\{|\overline{\Phi}_j^{(i)} - \hat{y}_i^{(j)}|\}. \quad (29)$$

$$j = 1, \ldots, u$$

$E_{90\%}^{(i)}$ is that value below which at least 90% of the absolute values of the deviations of the data from the model lie. Analogously thereto, $E_{80\%}^{(i)}$ is that value below which at least 80% of the absolute values of the deviations of the data from the model lie. With the optimum point $\overline{a}_i$ of the minimization problem according to Equation (24), a model $\tilde{\Phi}^{(i)}$ of the anticipation value of the measured quantity $\Phi^{(i)}$ can be recited as $$\tilde{\Phi}^{(i)} := \mathbb{R}^n \to \mathbb{R} \quad (30),$$

$$x \to \overline{a}_i^T r(x) \quad (31).$$

In particular, the gradient $\nabla \tilde{\Phi}^{(i)}$ can be analytically indicated with $$\nabla \tilde{\Phi}^{(i)}(x) = \frac{dr}{dx}(x) \cdot \overline{a}_i \text{ for all } x \in \mathbb{R}^n. \quad (32)$$

Optimization and Data-Driven Model Adaptation General Procedure

The control of the recovery boiler is carried out by a system operator. Due to the prescriptions of the system operator, a function $$F: \mathbb{R}^n \times \Omega \to \mathbb{R} \quad (33),$$

$$(x, \omega) \to g(\Phi(x, \omega), x) \quad (34).$$

derives. The prescriptions of the system operator enter into the selection of the function $$g: \mathbb{R}^m \times \mathbb{R}^n \to \mathbb{R} \quad (35),$$

$$(\eta, x) \to g(\eta, x) \quad (36)$$

One goal is comprised in the global minimization of the anticipation value of the function F. Due to the stochastic complexity of the described problem, a three-stage approximative procedure lies at hand:

1. With the assistance of the statistical data analysis implemented [ . . . ] the above-presented, stochastic description of the measured data and the models $\tilde{\Phi}$ resulting therefrom for the anticipation value of $\Phi$, the following global model $\tilde{F}$ is determined for the anticipation value of the function F:

$$\tilde{F}: \mathbb{R}^n \to \mathbb{R} \qquad (37),$$

$$x \to g(\tilde{\Phi}(x), x) \qquad (38).$$

For convex [sic] functions g, the following relationship can be recited with the assistance of Jensen's inequation:

$$\tilde{F}(x) \leq E(F(x, \bullet)) \qquad (39),$$

i.e. $\tilde{F}$ approximates the anticipation value of F from below. The symbol "$\bullet$" indicates that the random variable is eliminated by the relationship E( . . . ).

2. Upon employment of the developed global model, points in suitable surroundings of global minimizers of $\tilde{F}$ can be calculated by stochastic methods for global minimization (see [1]). These points serve as start points for a local minimization. When the global model that is considered is not exact enough due to the data situation, i.e. the quality is not adequately high, new operating points are designationally evaluated for improving the model (experimental design).

3. Potentially, the global model $\tilde{F}$ is not exact enough for the local minimization. A local model of the anticipation value of F is therefore respectively employed. Suitable linear regression models are again employed for the modelling, whereby data of the local environment of an iteration point being currently considered are now preferably considered. When too small a set of local data material is present, then this data material is suitably expanded (experimental design) by designational evaluation of new measured data (which correspond to operating points in view of a parameter space erected by the target functions). The strategies to be employed for the designational expansion of the data material are dependent, among other things, on the local optimization methods that are available for selection. Coming into consideration as optimization methods are:

3.1. Simplex-supported optimization procedures (see [2]) that only employ target function values.

3.2. Gradient-supported optimization procedures.

3.3. Procedures that, based on the idea of simplex-supported algorithms, additionally employ gradient information. The next local optimization step can thus be implemented with the expanded data (online optimization).

All employed models can be adaptively improved online by employing specific least square estimators (for instance, Kalman filters, see [3]) with identification of mavericks.

Specific formulations of questions can lead to vector optimization problems. The goal of the system control is thereby determined by a vector-significant function $\tilde{F}$:

$$\tilde{F}: \mathbb{R}^n \times \Omega \to \mathbb{R}^d \qquad (40),$$

$$(x, \omega) \to \hat{g}(\Phi(x, \omega), x) \qquad (41)$$

with a selectable vector-significant function $\hat{g}$ according to $$\hat{g}: \mathbb{R}^m \times \mathbb{R}^n \to \mathbb{R}^d \qquad (42),$$

$$(\eta, x) \to \hat{g}(\eta, x) \qquad (43).$$

Analogous to the scalar-significant optimization problems, vector optimization problems can be handled with a corresponding three-stage procedure.

Definition of Problem-Specific Target Functions (Case d=1)

The structure of possible target functions was described in the preceding section. Specific functions g must be defined for specific inquiries. A possible selection of g reads as follows:

$$g: \mathbb{R}^m \times \mathbb{R}^n \to \mathbb{R} \qquad (44),$$

$$(\eta, x) \to (\eta - \hat{\eta})^T G_1 (\eta - \hat{\eta}) + (x - \hat{x})^T G_2 (x - \hat{x}) \qquad (45),$$

whereby $G_1$ and $G_2$ represent positive (semi-) definite matrices. This function is interpreted in the following way:

1. A vector $\hat{\eta}$ describes a desired system condition. A point x is sought for which the system assumes the desired condition as exactly as possible. This vector $\hat{\eta}$ is prescribed by the system operator (in the form of deviations from the actual condition) but can also be automatically prescribed.

2. There are system conditions that must be avoided under all circumstances. One is therefore dependent on selecting manipulated variables x that are not too far from unproblematical manipulated variables. A specific unproblematic manipulated variable x is taken into consideration in the above function.

3. Additional restrictions can be additively introduced into the function g by penalty terms. An example of this reads as follows:

The function g is to be minimized, whereby the secondary conditions $$h(x)=0 \text{ and } k(x) \leq 0$$

are to be taken into consideration. This particularly ensues by minimizing the following term:

$$g + \mu_1 \cdot h^2(x) + \mu_2 \cdot k^4(x).$$

LIST OF REFERENCES

[1] Stefan Schäffler, "Global Optimization Using Stochastic Integration", Theorie und Forschung: Mathematik, S. Roderer Verlag, Regensburg, 1995, pages 19–48.

[2] T. F. STurm, "Ein Quasi-Newton-Verfahren durch Hermite-Interpolation", Dissertation, Technical University of Munich, 1991.

[3] Gerald J. Bierman, "Factorization Methods for Discrete Sequential Estimation", Mathematics in Science and Engineering, Volume 128, Academic Press, New York, 1977, pages 5–6.

We claim:

1. A computer-implemented method for designing a technical system comprising the steps of:

describing measured data of a technical system based on an equivalent model of said technical system, said equivalent model having a quality associated therewith;

determining a dimensional coefficient for said quality of said equivalent model;

adapting said equivalent model so that said dimensional coefficient for said quality is optimally high;

determining additional measured data for said technical system and improving said dimensional coefficient for said quality as said additional measured data are determined, and thereby obtaining a quality adaptive equivalent model; and employing said quality adapted equivalent model for designing said technical system.

2. A method as claimed in claim 1 comprising employing a regression model as said equivalent model.

3. A method as claimed in claim 1 wherein said equivalent model has at least one prescribable sub-area and wherein the step of improving the dimensional coefficient for the quality of the equivalent model comprises locally adapting said at least one prescribable sub-area of said equivalent model to improve said dimensional coefficient for the quality of the equivalent model.

4. A method as claimed in claim 1 comprising determining said additional measured data if said equivalent model models said technical system with inadequate precision.

5. A method as claimed in claim 1 comprising defining said quality as a quadratic deviation of said measured data from data defined by said equivalent model.

6. A method as claimed in claim 5 comprising sorting said measured data dependent on the quality produced thereby, relative to said deviation of said measured data from said data defined by said equivalent model and eliminating a predetermined percentage of said measured data which exceed a predetermined deviation.

7. A method as claimed in claim 6 comprising not eliminating said portion of said measured data if said portion of said measured data lie in an interconnected area of said equivalent model.

8. A method as claimed in claim 1 comprising reducing said measured data by pre-processing said measured data before determining said dimensional coefficient.

9. A method as claimed in claim 8 wherein the step of pre-processing said measured data comprises dividing said measured data into a plurality of classes.

10. A method as claimed in claim 1 wherein said quality adapted equivalent model has quality adapted equivalent model data associated therewith, and wherein the step of utilizing said quality adapted equivalent model for designing said technical system comprises using said quality adapted equivalent model data for controlling said technical system.

11. An arrangement for designing a technical system, comprising:

a processor supplied with measured data describing a technical system, said processor being programmed with an equivalent model representing said technical system;

said processor identifying equivalent model data from said equivalent model and comparing said equivalent model data to said measured data and thereby determining a dimensional coefficient representing a quality of said equivalent model;

said processor being programmed to modify said equivalent model so that said equivalent model has an optimally high quality;

said processor being supplied with additional measured data from said technical system and repeating the steps of determining said dimensional coefficient and adapting said equivalent model to improve said quality of said equivalent model, to obtain a quality adapted equivalent model; and said processor using said quality adapted equivalent model to design said technical system.

* * * * *